United States Patent
Harder et al.

(10) Patent No.: US 12,344,710 B2
(45) Date of Patent: Jul. 1, 2025

(54) SEMI-CRYSTALLINE COPOLYAMIDES, MOULDING COMPOUNDS COMPRISING SAME AND THEIR USE, AND MOULDINGS MANUFACTURED FROM SAME

(71) Applicant: EMS-PATENT AG, Domat/Ems (CH)

(72) Inventors: Philipp Harder, Chur (CH); Christian Schubert, Domat/Ems (CH); Ronny Ebling, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 179 days.

(21) Appl. No.: 16/987,913

(22) Filed: Aug. 7, 2020

(65) Prior Publication Data
US 2021/0040264 A1  Feb. 11, 2021

(30) Foreign Application Priority Data
Aug. 9, 2019 (EP) .................................... 19191021

(51) Int. Cl.
*C08G 69/26* (2006.01)
*C08K 7/14* (2006.01)

(52) U.S. Cl.
CPC .............. *C08G 69/265* (2013.01); *C08K 7/14* (2013.01); *C08G 2250/00* (2013.01)

(58) Field of Classification Search
CPC ........ C08L 77/00; C08G 69/26; C08G 69/265
See application file for complete search history.

(56) References Cited

U.S. PATENT DOCUMENTS

| | | | |
|---|---|---|---|
| 3,012,994 A * | 12/1961 | Bell | C08G 69/26 528/346 |
| 6,482,889 B1 | 11/2002 | Kurz | |
| 7,723,411 B2 | 5/2010 | Schneider | |
| 7,973,191 B2 | 7/2011 | Doring et al. | |
| 8,022,170 B2 | 9/2011 | Hoffman et al. | |
| 8,268,956 B2 | 9/2012 | Bühler et al. | |
| 8,383,244 B2 | 2/2013 | Bayer et al. | |
| 8,404,323 B2 | 3/2013 | Pfleghar et al. | |
| 8,586,662 B2 | 11/2013 | Harder et al. | |
| 8,604,120 B2 | 12/2013 | Stöppelmann et al. | |
| 8,993,662 B2 | 3/2015 | Kaplan | |
| 9,109,115 B2 | 8/2015 | Buhler et al. | |
| 9,133,322 B2 | 9/2015 | Roth et al. | |
| 9,359,532 B2 | 6/2016 | Kaplan | |
| 9,453,106 B2 | 9/2016 | Buhler et al. | |
| 9,644,081 B2 | 5/2017 | Aepli et al. | |
| 9,663,655 B2 | 5/2017 | Aepli | |
| 9,815,967 B2 | 11/2017 | Harder et al. | |
| 9,963,547 B2 | 5/2018 | Hoppe et al. | |
| 9,963,591 B2 | 5/2018 | Bayer et al. | |
| 9,969,882 B2 | 5/2018 | Thomas et al. | |
| 10,005,268 B2 | 6/2018 | Jeltsch et al. | |
| 10,047,054 B2 | 8/2018 | Kaplan | |
| 10,144,805 B2 | 12/2018 | Bayer et al. | |
| 10,233,326 B2 | 3/2019 | Koch et al. | |
| 10,544,286 B2 | 1/2020 | Nakano et al. | |
| 10,577,478 B2 | 3/2020 | Fujii et al. | |
| 10,683,418 B2 | 6/2020 | Thomas et al. | |
| 10,717,816 B2 | 7/2020 | Aepli et al. | |
| 10,751,961 B2 | 8/2020 | Cheung | |
| 10,767,047 B2 | 9/2020 | Aepli et al. | |
| 10,767,048 B2 | 9/2020 | Aepli et al. | |
| 10,836,905 B2 | 11/2020 | Wiedemann et al. | |
| 10,843,389 B2 | 11/2020 | Weis et al. | |
| 10,882,975 B2 | 1/2021 | Stöppelmann | |
| 10,889,713 B2 | 1/2021 | Schubert et al. | |
| 10,899,527 B2 | 1/2021 | Sütterlin et al. | |
| 2004/0030023 A1 * | 2/2004 | Buhler | C08L 77/00 524/495 |
| 2006/0235190 A1 | 10/2006 | Hoffman et al. | |
| 2006/0264542 A1 | 11/2006 | Schneider | |
| 2008/0135720 A1 | 6/2008 | Bühler et al. | |
| 2008/0300347 A1 | 12/2008 | Kurz et al. | |
| 2010/0069657 A1 | 3/2010 | Doring et al. | |
| 2010/0168423 A1 | 7/2010 | Doring et al. | |
| 2010/0279111 A1 | 11/2010 | Harder et al. | |
| 2011/0220667 A1 | 9/2011 | Pfleghar et al. | |
| 2012/0029133 A1 | 2/2012 | Stöppelmann et al. | |
| 2012/0115993 A1 | 5/2012 | Kaplan | |
| 2012/0237708 A1 | 9/2012 | Caviezel et al. | |
| 2012/0321829 A1 | 12/2012 | Bayer et al. | |
| 2013/0136911 A1 | 5/2013 | Bender et al. | |
| 2013/0317168 A1 | 11/2013 | Buhler et al. | |
| 2014/0094548 A1 | 4/2014 | Roth et al. | |
| 2014/0135458 A1 | 5/2014 | Kaplan | |

(Continued)

FOREIGN PATENT DOCUMENTS

| | | |
|---|---|---|
| EP | 3 309 199 A1 | 4/2018 |
| EP | 3 392 290 A1 | 10/2018 |
| GB | 0 922 677 A | 4/1963 |
| GB | 1 433 144 A | 4/1976 |
| GB | 2 351 898 A | 1/2001 |
| JP | 49-055796 A | 5/1974 |
| JP | 2018-062651 A | 4/2018 |
| JP | 2018-178117 A | 11/2018 |
| KR | 2003-0066669 A | 8/2003 |

OTHER PUBLICATIONS

US 10,875,999 B2, 12/2020, Stöppelmann et al. (withdrawn)
U.S. Appl. No. 09/533,280, filed Mar. 22, 2000.
U.S. Appl. No. 10/536,494, filed May 24, 2005.
U.S. Appl. No. 10/553,259, filed Oct. 11, 2005.
U.S. Appl. No. 11/950,964, filed Dec. 5, 2007.
U.S. Appl. No. 12/091,024, filed Apr. 21, 2008.

(Continued)

*Primary Examiner* — Gregory Listvoyb

(74) *Attorney, Agent, or Firm* — Leydig, Voit & Mayer, Ltd.

(57) ABSTRACT

The present invention relates to semi-crystalline copolyamides and to moulding compounds manufactured from same that contain at least one filler, and optionally additives in addition to the semi-crystalline copolyamide. The invention equally relates to mouldings manufactured from same.

15 Claims, No Drawings

(56) References Cited

U.S. PATENT DOCUMENTS

| | | |
|---|---|---|
| 2014/0171573 A1 | 6/2014 | Bayer et al. |
| 2014/0272227 A1 | 9/2014 | Jeltsch et al. |
| 2014/0275392 A1 | 9/2014 | Buhler et al. |
| 2015/0051343 A1 | 2/2015 | Kaplan |
| 2015/0104638 A1 | 4/2015 | Jeltsch et al. |
| 2015/0126635 A1 | 5/2015 | Liedloff et al. |
| 2015/0126701 A1 | 5/2015 | Liedloff et al. |
| 2015/0218374 A1 | 8/2015 | Thomas et al. |
| 2015/0284531 A1 | 10/2015 | Aepli et al. |
| 2015/0291795 A1 | 10/2015 | Aepli |
| 2015/0352765 A1 | 12/2015 | Hoffmann et al. |
| 2015/0368398 A1 | 12/2015 | Hoppe et al. |
| 2016/0130439 A1 | 5/2016 | Koch et al. |
| 2016/0280914 A1 | 9/2016 | Thomas et al. |
| 2016/0297123 A1 | 10/2016 | Weis et al. |
| 2016/0376423 A1 | 12/2016 | Harder et al. |
| 2017/0058123 A1 | 3/2017 | Sütterlin et al. |
| 2017/0107326 A1 | 4/2017 | Bayer et al. |
| 2017/0137608 A1 | 5/2017 | Stöppelmann |
| 2017/0137609 A1 | 5/2017 | Stöppelmann |
| 2017/0183140 A1 | 6/2017 | Sütterlin et al. |
| 2017/0225414 A1 | 8/2017 | Cheung |
| 2018/0022900 A1 | 1/2018 | Nakano et al. |
| 2018/0100064 A1 | 4/2018 | Aepli et al. |
| 2018/0112059 A1 | 4/2018 | Fujii et al. |
| 2018/0155545 A1 | 6/2018 | Stöppelmann et al. |
| 2018/0171141 A1 | 6/2018 | Thomas et al. |
| 2018/0251600 A1 | 9/2018 | Hoffmann et al. |
| 2018/0298191 A1 | 10/2018 | Schubert et al. |
| 2019/0055356 A1 | 2/2019 | Aepli et al. |
| 2019/0055404 A1 | 2/2019 | Aepli et al. |
| 2019/0055405 A1 | 2/2019 | Aepli et al. |
| 2019/0062554 A1 | 2/2019 | Wiedemann et al. |
| 2019/0136053 A1 | 5/2019 | Fujii et al. |
| 2020/0024415 A1 | 1/2020 | Holzschuh et al. |
| 2020/0024416 A1 | 1/2020 | Holzschuh et al. |
| 2020/0109284 A1 | 4/2020 | Wiedemann |
| 2020/0198203 A1 | 6/2020 | Cavieze |

OTHER PUBLICATIONS

U.S. Appl. No. 12/539,972, filed Aug. 12, 2009.
U.S. Appl. No. 12/540,007, filed Aug. 12, 2009.
U.S. Appl. No. 12/743,097, filed May 14, 2010.
U.S. Appl. No. 13/045,682, filed Mar. 11, 2011.
U.S. Appl. No. 13/186,785, filed Jul. 20, 2011.
U.S. Appl. No. 13/290,718, filed Nov. 7, 2011.
U.S. Appl. No. 13/421,541, filed Mar. 15, 2012.
U.S. Appl. No. 13/481,451, filed May 25, 2012.
U.S. Appl. No. 13/674,395, filed Nov. 12, 2012.
U.S. Appl. No. 13/800,102, filed Mar. 13, 2013.
U.S. Appl. No. 13/898,099, filed May 20, 2013.
U.S. Appl. No. 13/971,376, filed Aug. 20, 2013.
U.S. Appl. No. 14/078,134, filed Nov. 12, 2013.
U.S. Appl. No. 14/204,404, filed Mar. 11, 2014.
U.S. Appl. No. 14/205,667, filed Mar. 12, 2014.
U.S. Appl. No. 14/221,930, filed Mar. 21, 2014.
U.S. Appl. No. 14/397,529, filed Oct. 28, 2014.
U.S. Appl. No. 14/397,534, filed Oct. 28, 2014.
U.S. Appl. No. 14/504,651, filed Oct. 2, 2014.
U.S. Appl. No. 14/607,676, filed Jan. 28, 2015.
U.S. Appl. No. 14/663,105, filed Mar. 19, 2015.
U.S. Appl. No. 14/681,669, filed Apr. 8, 2015.
U.S. Appl. No. 14/729,277, filed Jun. 3, 2015.
U.S. Appl. No. 14/740,736, filed Jun. 16, 2015.
U.S. Appl. No. 14/915,031, filed Feb. 26, 2016.
U.S. Appl. No. 14/935,642, filed Nov. 9, 2015.
U.S. Appl. No. 15/090,881, filed Apr. 5, 2016.
U.S. Appl. No. 15/105,011, filed Sep. 6, 2016.
U.S. Appl. No. 15/253,506, filed Aug. 31, 2016.
U.S. Appl. No. 15/285,947, filed Oct. 5, 2016.
U.S. Appl. No. 15/349,636, filed Nov. 11, 2016.
U.S. Appl. No. 15/349,729, filed Nov. 11, 2016.
U.S. Appl. No. 15/385,432, filed Dec. 20, 2016.
U.S. Appl. No. 15/385,519, filed Dec. 20, 2016.
U.S. Appl. No. 15/546,373, filed Jul. 26, 2017.
U.S. Appl. No. 15/729,321, filed Oct. 10, 2017.
U.S. Appl. No. 15/789,069, filed Oct. 20, 2017.
U.S. Appl. No. 15/826,177, filed Nov. 29, 2017.
U.S. Appl. No. 15/895,537, filed Feb. 13, 2018.
U.S. Appl. No. 15/910,891, filed Mar. 2, 2018.
U.S. Appl. No. 15/955,737, filed Apr. 18, 2018.
U.S. Appl. No. 16/094,198, filed Oct. 16, 2018.
U.S. Appl. No. 16/104,028, filed Aug. 16, 2018.
U.S. Appl. No. 16/104,035, filed Aug. 16, 2018.
U.S. Appl. No. 16/104,043, filed Aug. 16, 2018.
U.S. Appl. No. 16/115,055, filed Aug. 28, 2018.
U.S. Appl. No. 16/515,119, filed Jul. 18, 2019.
U.S. Appl. No. 16/515,151, filed Jul. 18, 2019.
U.S. Appl. No. 16/595,559, filed Oct. 8, 2019.
U.S. Appl. No. 16/717,369, filed Dec. 17, 2019.
U.S. Appl. No. 16/956,564, filed Jun. 20, 2020.
U.S. Appl. No. 16/956,576, filed Jun. 20, 2020.
U.S. Appl. No. 16/956,579, filed Jun. 20, 2020.
U.S. Appl. No. 16/956,580, filed Jun. 20, 2020.
U.S. Appl. No. 16/988,011, filed Aug. 7, 2020.
U.S. Appl. No. 17/129,507, filed Dec. 21, 2020.
U.S. Appl. No. 17/129,606, filed Dec. 21, 2020.
European Patent Office, Extended European Search Report in European Patent Application No. 19 191 021.5 (Feb. 4, 2020).
China National Intellectual Property Administration, First Office Action in Chinese Patent Application No. 2020107944796 (Mar. 31, 2023).
Japan Patent Office, Notification of Reasons for Refusal in Japanese Patent Application No. 2020-132942 (Jul. 30, 2024).
Korean Intellectual Property Office, Notice of Reasons for Rejection in Korean Patent Application No. 10-2020-0099084 (May 16, 2025).

* cited by examiner

SEMI-CRYSTALLINE COPOLYAMIDES, MOULDING COMPOUNDS COMPRISING SAME AND THEIR USE, AND MOULDINGS MANUFACTURED FROM SAME

This patent application claims the benefit of European Patent Application No. 19 191 021.5, filed on Aug. 9, 2019, the disclosure of which is incorporated herein by reference in its entirety for all purposes.

The present invention relates to semi-crystalline copolyamides and to moulding compounds manufactured from same that comprise at least one filler, and optionally additives in addition to the semi-crystalline copolyamide. The invention equally relates to mouldings manufactured from same.

A plurality of polyamide moulding compounds are known from the prior art, wherein the composition of the moulding compounds is adapted to their desired property profile. In particular with reinforced polyamide moulding compounds, a gloss and smooth surface in mouldings produced therefrom should be made possible in addition to advantageous mechanical properties. The technical processing properties of the moulding compounds should not be impaired in this process. However, with glass fiber reinforced injection molded products, the surface of the molded parts is frequently dull and rough due to irregularities or due to the glass fiber effect. With visible molded parts that are often relevant to the design of a body, this effect is, however, generally not desirable.

The surface quality of an injection molded part is inter alia influenced by the crystallization behavior of the copolyamide. High temperatures of the injection moulding tools can here admittedly improve the surface quality, but also extends the cooling time until the demoulding temperature has been reached.

Polyamides or polyester amides are known from GB 922,677 that are formed from at least 50 mol % of 1,3- or 1,4-bis(aminomethyl)cyclohexane. They are used for manufacturing fibers, films, or mouldings.

Transparent polyamides are known from GB 1 433 144 from which mouldings can be produced at relatively high temperatures without losing the good mechanical properties. They are amorphous polyamides here that are formed from a mixture of 1,3-bis(aminomethyl)cyclohexane and an aliphatic diamine and a mixture of an aromatic and an aliphatic dicarboxylic acid. The surface properties of the mouldings produced from these moulding compounds will not be addressed in this document.

Fibers composed of a blend of a homopolyamide (PA 6 or PA 66) and a copolyamide that is formed at more than 80 wt % from the monomers of the homopolyamide and at less than 20 wt % of 1,3-bis(aminomethyl)cyclohexane and 1,6-hexanediamine are known from GB 2 351 898. Both aliphatic and aromatic dicarboxylic acids are used as carboxylic acids. These fibers are particularly suitable for the manufacture of textile materials.

Starting from this, it was the object of the present invention to provide copolyamides for manufacturing moulding compounds that permit the manufacture of mouldings that have very good visual properties in addition to a high stiffness.

This object is achieved by the semi-crystalline copolyamides, and by the polyamide moulding compounds described herein, and by the mouldings described herein. Uses in accordance with the invention are also described.

In accordance with the invention, semi-crystalline copolyamides are provided that are formed from the following monomers (a1) to (a5):
- (a1) 23 to 37.5 mol % 1,6-hexanediamine;
- (a2) 12.5 to 22 mol % 1,3-bis(aminomethyl)cyclohexane;
- (a3) 0 to 5 mol % at least one diamine with 2 to 35 carbon atoms, differing from monomers (a1) and (a2);
- (a4) 45 to 50 mol % 1,6-hexanedioic acid;
- (a5) 0 to 5 mol % at least one dicarboxylic acid with 2 to 44 carbon atoms, differing from monomer (a4);

The proportions of the monomers (a1), (a2), and (a3) are with respect to the sum of the diamines used and add up to 50 mol %. The proportions of the monomers (a4) and (a5) are with respect to the sum of the dicarboxylic acids used and add up to 50 mol %. The monomers (a1) to (a5) add up to 100 mol %.

DEFINITIONS OF TERMS

Notation and Abbreviations for Polyamides and Their Monomers

In the sense of the present invention, the term "polyamide" (abbreviation PA) is understood as an umbrella term; it comprises homopolyamides and copolyamides. The selected notation and abbreviations for polyamides and their monomers correspond to those set forth in the ISO standard 16396-1 (2015, (D)). The abbreviations used therein are used in the following as synonymous with the IUPAC names of the monomers. In particular the following abbreviations are used for monomers in the present application: 1,3-BAC for 1,3-bis(aminomethyl)cyclohexane (also called 1,3-cyclohexane dimethaneamine, CAS No. 2579-20-6); 1,4-BAC for 1,4-bis(aminomethyl)cyclohexane (also called 1,4-cyclohexane dimethaneamine, CAS No. 2549-93-1; IDP for isophoronediamine (also called 3-(aminomethyl)-3,5,5-trimethyl cyclohexaneamine, 1-amino-3-aminomethyl-3,5,5-trimethyl cyclohexane, or cyclohexane methaneamine, 5-amino-1,3,5,5-trimethyl, CAS No. 2855-13-2); MACM for bis(4-amino-3-methylcyclohexyl)methane (also called 3,3'-dimethyl-4,4'-diaminodicyclohexylmethane, CAS No. 6854-37-5); PACM for bis(4-amino-cyclohexyl)methane (also called 4,4'-dimamino-cyclohexyl)methane, CAS No. 1761-71-3); 6 for 1,6-hexanediamine (CAS No. 124-09-4), T for terephthalic acid (CAS No. 100-21-0); I for isophthalic acid (CAS No. 121-95-5), 6 for 1,6-hexanedioic acid (CAS No. 124-04-9).

Semi-Crystalline Copolyamides

In the sense of the present invention, semi-crystalline copolyamides are those copolyamides that have a melting point and/or those copolyamides that preferably have a melting heat of more than 4 J/g at a heating rate of 20 K/min in differential scanning calorimetry, (DSC) in accordance with ISO 11357-3 (2013).

General Remarks on the Compounds

The terms "containing" and "comprising" in the present claims and in the description mean that further components are not excluded. Within the framework of the present invention, the term "consists of" is to be understood as a preferred embodiment of the terms "containing" or "comprising". If it is defined that a group "contains" at least a specific number of components or "comprises" it, this is also to be understood such that a group is disclosed that preferably "consists" of these components.

General Remarks on the Indications of Quantity

The quantity indications of the diamines and dicarboxylic acids contained in the copolyamide respectively add up to 50 mol %. All the monomers contained in the copolyamide add up to 100 mol % in sum. The fixed ranges of the indications of quantity for the individual monomers are to be understood such than an arbitrary quantity for each of the individual components can be selected within the specified ranges provided that the strict provision is satisfied that the sum of all the components monomers contained in the copolyamide results in 100 wt %.

It applies to the indications of quantity of the dicarboxylic acids and of the diamines of the semi-crystalline copolyamides that the sum of the molar quantities of all the diamines is substantially equal to the sum of the molar quantities of all the dicarboxylic acids. Substantially equal here means a maximum surplus of the dicarboxylic acids or of the diamines of 3%, i.e. the molar ratio of dicarboxylic acids to diamines is 1.03:1 to 1:1.03. A maximum surplus of the dicarboxylic acids or of the diamines of 2% is preferred, i.e. the molar ratio of dicarboxylic acids to diamines amounts to 1.02:1 to 1:1.02. The surplus serves the balancing of losses of monomer and/or the regulation of the relative viscosity of the polyamide and thus of the molar mass.

The indications of quantity with respect to the monomers are here to be understood such that a corresponding molar ratio of these monomers used in the polycondensation is also again found in the copolyamides manufactured by polycondensation.

The polyamide moulding compounds in accordance with the present invention comprise or consist of the components (I) and (II), and optionally (III); the provision applies here that the components (I), II) and (III) add up to 100 wt % in sum. The fixed ranges of the indications of quantity for the individual components (I), (II), and (III) are to be understood such than an arbitrary quantity for each of the individual components can be selected within the specified ranges provided that the strict provision is satisfied that the sum of all the components (I) to (III) produces 100 wt %.

Semi-Crystalline Copolyamides

The proportion of monomer (a1) in the semi-crystalline copolyamide is preferably in the range from 23 to 36 mol %, particularly preferably in the range from 25 to 34 mol %, and very particularly preferably in the range from 27.5 to 32.5 mol %. The proportion of monomer (a2) in the semi-crystalline copolyamide is preferably in the range from 14 to 22 mol %, particularly preferably in the range from 16 to 20 mol %, and very particularly preferably in the range from 17.5 to 20 mol %. The proportion of monomer (a3) in the semi-crystalline copolyamide is preferably in the range from 0 to 2.5 mol %. The proportions of the monomers (a1), (a2), and (a3) are with respect to the sum of the diamines used and add up to 50 mol %.

The proportion of monomer (a4) in the semi-crystalline copolyamide is preferably in the range from 47.5 to 50 mol %. The proportion of monomer (a5) in the copolyamide is preferably in the in the range from 0 to 2.5 mol-%. The proportions of the monomers a4 and (a5) are with respect to the sum of the diamines used and add up to 50 mol %.

The at least one monomer (a3) is preferably selected from the group consisting of ethylenediamine, butanediamine, pentanediamine, methylpentanediamine, 1,8-octanediamine, methyloctanediamine, 1,9, nonanediamine, 1,10-decanediamine, 1,11-undecanediamine, 1,12-dodecanediamine, trimethyl hexamethylenediamine, 1,4-cyclohexanediamine, 1,3-cyclohexanediamine, bis-(4-amino-3-methyl-cyclohexyl) methane, bis-(4-amino-cyclohexyl)methane, isophoronediamine, 1,4-bis(aminomethyl)cyclohexane, m-xylylenediamine, p-xylylenediamine bis(aminocyclohexyl)propane and its alkyl derivatives, norbornanediamine and bis(aminomethyl)norbornane.

A further preferred group from which the at least one monomer (a3) is selected consists of pentanediamine, methylpentanediamine, methyloctanediamine, 1,9-nonanediamine, 1,10-decanediamine, 1,12-dodecanediamine, trimethylhexamethylenediamine, bis-(4-amino-3-methylcyclohexyl)methane, bis-(4-amino-cyclohexyl)methane, isophoronediamine, 1,4-bis(aminomethyl)cyclohexane, m-xylylenediamine and p-xylylenediamine.

The at least one monomer (a3) is particularly preferably selected from the group consisting of pentanediamine, methylpentanediamine, methyloctanediamine, 1,9-nonanediamine, 1,10-decanediamine, 1,12-dodecanediamine, trimethylhexamethylenediamine, bis-(4-amino-3-methylcyclohexyl)methane, bis-(4-amino-cyclohexyl)methane and isophoronediamine.

Bis-(4-amino-3-methyl-cyclohexyl)methane, bis-(4-amino-cyclohexyl)methane and/or isophoronediamine is very particularly preferably used as the monomer (a3).

The at least one monomer (a5) is preferably selected from the group consisting of isophthalic acid, terephthalic acid, naphthalene dicarboxylic acid, 1,9-nonanedioic acid, 1,10-decanedioic acid, 1,11-undecanedioic acid, 1,12-dodecanedioic acid, 1-13-tridecanoic acid, 1,14-tetradecanedioic acid, 1,15-pentadecane acid, 1,16-hexadecanedioic acid, 1,17-heptadecanedioic acid, 1,18-octadecanedioic acid, arachidic acid, Japan acid, behenic acid, cyclohexanedioic acid, phenylindanedicarboxylic acid, phenylenediooxydiacetic acid, and dimer fatty acid with 36 or 44 carbon atoms.

A further preferred group from which the at least one monomer (a5) is selected consists of isophthalic acid, terephthalic acid, 1,10-decanedioic acid, 1,12-dodecanedioic acid, 1,14-tetradecanedioic acid, 1,16-hexadecanedioic acid.

The at least one monomer (a5) is particularly preferably selected from the group consisting of isophthalic acid, terephthalic acid, 1,10-decanedioic acid, and 1,12-dodecanedioic acid.

Isophthalic acid and/or terephthalic acid is very particularly preferably used as the monomer (a5).

The semi-crystalline copolyamide (component A) preferably does not contain either lactams or amino acids.

It is preferred that the semi-crystalline copolyamides have a relative viscosity, measured with 0.5 g in 100 ml m-cresol at 20° C., of 1.45 to 2.10, particularly preferably 1.50 to 2.05, very particularly preferably 1.55 to 1.98.

The semi-crystalline copolyamides preferably have a glass transition temperature in the range from 50 to 200° C., preferably in the range from 60 to 190° C., particularly preferably in the range from 65 to 90° C.

The semi-crystalline copolyamides preferably have a melting temperature in the range from 180 to 260° C., preferably in the range from 205 to 245° C., particularly preferably in the range from 210 to 235° C.

It is preferred that the semi-crystalline copolyamides have a crystallization temperature in the range from 130 to 200° C., preferably in the range from 140 to 200° C.

A further preferred embodiment provides that the semi-crystalline copolyamides have a crystallization rate in the range from 12 to 50 J/g min, particularly preferably in the range from 15 to 47 J/g min, very particularly preferably in the range from 23 to 45 J/g min.

The copolyamides in accordance with the invention can preferably have one or more, particularly preferably all, the previously named properties (relative viscosity, glass transition temperature, melting temperature, crystallization temperature, crystallization rate).

Polyamide Moulding Compound

The polyamide moulding compound in accordance with the invention contains a semi-crystalline copolyamide such as was previously defined.

The polyamide moulding compound in accordance with the invention preferably comprises or consists of I) 22 to 70 wt % of at least one copolyamide such as was previously defined II) 30 to 70 wt % of at least one filler and III) 0 to 8 wt % of at least one additive.

Component (III) here differs from component (II and the quantity proportions of components (I) to (III) add up to 100 wt %.

The proportion of component (I) in the polyamide moulding compound is preferably in the range from 29 to 64.9 wt %, particularly preferably in the range from 36 to 59.8 wt %, with respect to the total weight of the polyamide moulding compound.

The proportion of component (II) in the polyamide moulding compound is preferably in the range from 35 to 65 wt %, and particularly preferably in the range from 40 to 60 wt %, with respect to the total weight of the polyamide moulding compound.

The proportion of component (III) in the moulding compound is preferably in the range from 0.1 to 6 wt %, and particularly preferably in the range from 0.2 to 4 wt %, with respect to the total weight of the polyamide moulding compound.

The behavior of polyamide moulding compounds in the thermoplastic process into molded parts by means of injection moulding or extrusion is influenced by a series of thermal properties of the moulding compound.

The cycle time has a substantial influence on the economy of the injection moulding process. The cooling time of the moulding compounds in the tool until the parts are sufficiently stable that they can be demolded without deformation or ejector marks is limiting. Ideally, the moulding compound should also completely crystallize during the cooling time in the tool. A delayed crystallization after the demoulding results in shrinkage and deformation. Fast crystallizing moulding compounds are characterized by a high crystallization rate and so a short cycle time.

A low melting point saves energy since the mass temperature can be lower. At the same time, thermal degradation and the discoloration of the moulding compound associated therewith is prevented.

At the same time, the crystallization temperature and rate may not be so high, however, that the moulding compound immediately solidifies on contact with the cold tool surface. An effective holding pressure without premature solidification of the moulding compound is necessary for a precise demoulding of the surface. The moulding compounds in accordance with the invention achieve a very good surface with good crystallinity within the minimum cooling time specified by the heat conductivity of the polyamide moulding compound with customary wall thicknesses.

A high stiffness of the mouldings is additionally desired that is expressed by a high modulus of elasticity.

For a high gloss surface, the tool temperature generally has to be higher than the glass transition temperature. Tool temperatures that are too high, however, extend the cooling time unnecessarily and can result in sticking and removal marks at the parts surface.

It must also be noted that at tool temperatures of 190 to 200° C. water has to be replaced with a heat transfer oil as the heating medium. Expensive construction measures are then additionally required. Both long cycle times and additional costs for the tool temperature control are disadvantageous for the moulding compound since they increase the costs of the parts produced therefrom.

A moulding manufactured in accordance with the invention preferably has a modulus of elasticity determined in accordance with ISO 527 of at least 5000 MPa, preferably at least 8000 MPa, particularly preferably at least 12000 MPa.

A moulding manufactured in accordance with the invention preferably has a gloss value at the surface of 70 to 100 GU determined in accordance with DIN EN 2813 (2015) in the dry state at 60°.

A moulding manufactured in accordance with the invention preferably has a gloss value at the surface of 60 to 100 GU determined in accordance with DIN EN 2813 (2015) in the conditioned state at 60°.

The mouldings manufactured in accordance with the invention can preferably have one or more, particularly preferably all, of the previously named properties (modulus of elasticity and gloss values).

Component (II)

The term fillers (component (II)) comprises fibrous or acicular fillers, particle-shaped fillers and mixtures thereof.

The fillers can preferably be coated or surface treated, i.e. they can be equipped with a suitable finishing or bonding agent system or can be otherwise surface activated. Systems on a basis of urethanes, silanes, epoxides, polyamides, polyhydroxyethers, acrylates, respective combinations or mixtures thereof can be used for this purpose, for example. The smoothing or bonding agent systems can also contain other auxiliary agents such as static inhibitors or mold lubricants.

The fibrous or acicular fillers are preferably selected from the group consisting of glass fibers, carbon fibers, basalt fibers, slag fibers, metal fibers, whiskers, mineral fibers, Wollastonite, ground glass fibers, ground carbon fibers, ground mineral fibers, and mixtures thereof. The fibrous or acicular fillers are particularly preferably selected from the group consisting of glass fibers, carbon fibers, basalt fibers, and mixtures thereof. Exclusively glass fibers are very particularly preferably used as fibrous or acicular fillers.

Stable fibers or continuous fibers (rovings)can be used for the glass fibers or carbon fibers.

The glass fibers or carbon fibers have a cross-section that is round, oval, elliptical, angular, or rectangular. Fibers having a non-circular cross-section ("flat fibers"), in particular oval, elliptical, angular, or rectangular, can also be used.

The appearance of the glass fibers can be stretched or spiral.

Glass fibers from all glass types such as A-, C-, D-, E-, E-CR-, L-, LD-, M-, NE-, S-, R AR-glass or any desired mixtures thereof can be used. Glass fibers from E-glass or glass fibers from mixtures with E-glass or mixtures with E-glass fibers are preferred.

The staple glass fibers preferably have a fiber length of 1 to 25 mm, preferably 1.5 to 20 mm, particularly preferably 2 to 12 mm, and very particularly preferably 2 to 8 mm.

The glass fibers preferably have a diameter of 5 to 20 µm, preferably of 5 to 15 µm, and particularly preferably of 6 to 12 µm.

If the glass fibers are used as continuous fibers (rovings) in a pultrusion process, they preferably have a diameter of a maximum of 20 µm, preferably of a maximum of 18 µm, particularly preferably of 10 to 17 µm.

The carbon fibers preferably have a diameter of 3 to 12 µm, preferably 4 to 10 µm, particularly preferably 4 to 3 µm.

With flat fibers, the aspect ratio, i.e. the ratio of the main cross-sectional axis to the secondary cross-sectional axis amounts to 1.5 to 8, preferably 2 to 6, particularly preferably 3 to 5.

Flat glass fibers are particularly preferred from the flat fibers.

The cross-sectional axes of the flat glass fibers are 3 to 30 µm long. The length of the secondary cross-sectional axis preferably amounts to 3 to 20 µm, particularly preferably 4 to 10 µm, and the length of the main cross-sectional axis to 6 to 40 µm, particularly preferably 12 to 30 µm.

The particle-shaped fillers are preferably selected from the group consisting of dolomite, silicates, quartz, talcum, mica, kaolin, perlite, silica, precipitated or pyrogenic silicon dioxide, diatomite, titanium dioxide, magnesium carbonate, magnesium hydroxide, aluminum hydroxide, ground or precipitated calcium carbonate, chalk, calcium, limestone dust, slate flour, feldspar, barium carbonate, barium sulfate, synthetic sheet silicates, natural sheet silicates, permanent magnetic or magnetizable metals or alloys, glass flakes, glass spheres, hollow glass spheres, hollow spherical silicate fillers, and mixtures thereof. The particle-shaped fillers are preferably selected from the group consisting of silicates, quartz, talcum, mica, kaolin, perlite, silica, precipitated or pyrogenic silicon dioxides, diatomite, titanium dioxide, magnesium carbonate, magnesium hydroxide, aluminum hydroxide, ground or precipitated calcium carbonate, chalk, calcium, limestone dust, slate flour, feldspar, barium carbonate, barium sulfate, synthetic sheet silicates, natural sheet silicates, glass flakes, glass spheres, hollow glass spheres, hollow spherical silicate fillers, and mixtures thereof. The particle-shaped fillers are very particularly preferably selected from the group consisting of silicates, talcum, mica, kaolin, titanium dioxide, ground or precipitated calcium carbonate, chalk, limestone dust, slate flour, synthetic sheet silicates, natural sheet silicates, glass flakes, glass spheres, hollow glass spheres, and mixtures thereof.

At least one fibrous or acicular filler or a mixture of at least one fibrous or acicular filler with at least one particle-shaped filler is preferably used as the filler (component (II)) in the polyamide moulding compound in accordance with the invention.

If a mixture of at least one fibrous or acicular filler with at least one particle-shaped filler is used, the proportion of the particle-shaped filler makes up a maximum of half, preferably a maximum of a third, particularly preferably a maximum of a quarter, of the total amount of the filler.

Exclusively fibrous or acicular fillers are particularly preferably used as the filer in the polyamide moulding compound in accordance with the invention.

Component (III)

In accordance with a preferred embodiment of the present invention, the at least one additive (component (C)) is selected from the group consisting of inorganic and organic stabilizers, in particular antioxidants, antiozonants, light stabilizers, in particular UV stabilizers, UV absorbers, or UV blockers, mold lubricants, dyestuffs, marking agents, pigments, black carbon, graphite, graphene, polyamide oligomers, carbon nanotubes, photochromic agents, static inhibitors, demoulding means, antiblocking agents, chain extending additives, chain shortening additives, optical brighteners, IR absorbers, NIR absorbers, non-halogen flameproofing agents, metallic pigments, metallic flakes, metal-coated particles and mixtures thereof.

The polyamide oligomers preferably have a number average molar mass of 1000 to 6000 g/mol, particularly preferably of 2500 to 4500 g/mol, determined by means of gel permeation chromatography (GPC) with a triple detector.

The at least one additive can also be added in masterbatch form. A polyamide is preferably used as the base polymer of the masterbatch. This polyamide is preferably selected from the group consisting of PA 6, PA 66, PA 12, PA 1012, PA 1212, PA 6/12, PA 6/66, PA 6/69 and their mixtures or consists of the copolyamide (A) itself.

Mouldings

In accordance with the invention, mouldings are equally provided that can be manufactured from the previously described copolyamides or moulding compounds. The mouldings in accordance with the invention can be manufactured from the copolyamides or polyamide moulding compound in accordance with the invention via the common processing techniques such as injection moulding methods.

A preferred embodiment provides that the moulding is selected from the group consisting of non-lacquered visible parts with or without a function, in a car passenger compartment or trunk, in the household, mechanical engineering, on electrical devices, electronic devices, domestic appliances, furniture, in particular fan blades, gear sticks, rocker switches, buttons, rotary controls, straps, operating elements for seat adjustment, operating elements on the steering column, operating levers, operating elements, drawers, holders for accessories, drink holders, luggage hooks, covers, light switches, razor head, scissor parts, threaded rods, in particular for insulin pumps, housings, and decor elements.

Uses

The present invention further relates to the use of the above-defined polyamide moulding compounds in accordance with the invention for the manufacture of non-lacquered visible parts with or without a function, in a car passenger compartment or trunk, in the household, mechanical engineering, on electrical devices, electronic devices, domestic appliances, furniture, in particular fan blades, gear sticks, rocker switches, buttons, rotary controls, straps, operating elements for seat adjustment, operating elements on the steering column, operating levers, operating elements, drawers, holders for accessories, drink holders, luggage hooks, covers, light switches, razor head, scissor parts, threaded rods, in particular for insulin pumps, housings, and decor elements.

The subject matter in accordance with the invention will be explained in more detail with reference to the following examples without intending to restrict it to the specific embodiments shown here.

EXAMPLES AND COMPARISON EXAMPLES

Measurement Methods
Relative Viscosity

The relative viscosity was determined in accordance with ISO 307 (2007) at 20° C. 0.5 g polymer pellets were weighed into 100 ml m-cresol for this purpose; the calculation of the relative viscosity (RV) in accordance with RV=t/t0 took place on the basis of section 11 of the standard.

Glass Transition Temperature (Tg), Crystallization Heat, Melting Heat, and Melting Point The determination was made on pellets in accordance with SO 11357-3 (2013).

Differential scanning calorimetry (DSC) was performed in each of the three heating steps at a heating rate of 20

K/min. Cooling took place at 20 K/min after the first heating. The sample was quenched in dry ice after the second heating. The glass transition temperature (Tg) is determined at the third heating, the melting point at the second. The crystallization temperature and the crystallization rate are determined on the cooling after the first heating. The temperature at the peak maximum is specified as the melting point. The center of the glass transition range, that is here specified as the glass transition temperature (Tg), was determined using the "half height" method.

Gloss Value at 60°

The gloss value at a measurement angle of 60° was determined in accordance with DIN EN ISO 2813 (2015) on a Gloss Tector (ATP Messtechnik GmbH, Germany) at 23° C. at plates having the dimensions 60×60×2 mm. The indication is made in gloss units (GU).

Modulus of Elasticity

The determination of the modulus of elasticity was carried out in accordance with ISO 527 (2012) at 23° C. at a tensile speed of 1 mm/min at an ISO tensile rod (type A1, mass 170×20/10×4) manufactured in accordance with the standard: ISO/CD 3167 (2003).

Molar Mass Determination

The determination of the molar mass is done by means of gel permeation chromatography (GPC) with a triple detector: Refractive index, viscosity, and light scatter (7° and 90°).

The samples are dissolved in hexafluoroisopropanol (HFIP) (approx. 5 mg polymer in 1 ml) for the measurement and are filtered in vials by disposable syringe filters before the filling.

Unit: Malvern OMNISEC GPC-System
Software: Malvern OMNISEC Version 10.41
Column: Malvern HFIP3000+HFIP6000M 300×7.8 mm, 10 μm particle size
Eluent: HFIP with 0.1 M potassium trifluoroacetate
Column temperature: 40° C.
Detector temperature: 40° C.
Flow rate 1.0 ml/min The molecular masses (number average Mn and weight average Mw) are determined using the triple detection method. The calibration of the GPC system takes place using a monodisperse PMMA standard. Three respective determinations are carried out. The arithmetic mean of the molecular mass is indicated.

The solvent HFIP was procured in HPLC quality from Fluorochem, Germany, the potassium trifluoroacetate from Sigma-Aldrich, Switzerland.

The disposable filters can be obtained from Chemie Brunschwig, Switzerland, under the name SFPTFE0250022NBC (PTFE membrane, pore size 0.45 μm, filter diameter 25 mm).

The disposal filters can be obtained from VWR International GmbH, Germany.

Manufacturing the Test Specimens

Pellets having a water content of less than 0.1 wt % were used to manufacture the test specimens.

The test specimens were manufactured on an injection moulding machine of Arburg, model Allrounder 420 C 1000-250. Cylinder temperatures rising and falling from the feed to the nozzle were used in this process.

ISO Tensile Rods
Cylinder temperatures: 260/265/270/275/280/275° C.
Tool temperature: 110° C.
Plates 60×60×2 mm
Cylinder temperatures: 270/275/280/285/290/285° C.
Tool temperature: 110° C.

A polished tool was used for the manufacture of the plates.

The test specimens were used in the dry state if not otherwise specified; for this purpose they were stored for at least 48 h after the injection moulding at room temperature in a dry environment, i.e. over silica gel.

The 60×60×2 mm plates for the surface gloss measurement in the conditioned state were stored in accordance with ISO 1110 for 7 days at 70° and at 62% relative humidity.

Starting Materials

The monomers used in the examples and comparison examples are collected in Table 1 and the components (II) and (III) of the polyamide moulding compounds used are collected in Table 2.

TABLE 1

Materials used in the examples and in the comparison examples

| Monomer | CAS No. | Melting range [° C.] | Tradename | Manufacturer |
|---|---|---|---|---|
| 1.6-hexanediamine (a1) | 124-09-4 | 39 to 42 | — | BASF SE, Germany |
| 1,3-bis(aminomethyl)cyclohexane (a2) | 2579-20-6 | <−70 | 1,3-BAC | Mitsubishi Gas Chemical Company, Japan |
| bis(4-amino-cyclohexyl)methane (a3-1) | 6864-37-5 | −7 to −0.6* | Laromin C260 | BASF SE, Germany |
| bis(4-amino-cyclohexyl)methane (a3-2) | 1761-71-3 | −16 to 46 | 4,4-diaminodicyclo-hexylmethane | BASF SE, Germany |
| Isophoronediamine (a3-3) | 2855-13-2 | 10 | — | BASF SE, Germany |
| 1.6 - hexanedioic acid (a4) | 124-04-9 | 151 | — | BASF SE, Germany |
| Isophthalic acid (a5-1) | 121-91-5 | 345 to 348 | — | Flint Hills Resources, Switzerland |
| Terephthalic acid (a5-2) | 100-21-0 | >400 | — | GMS - Chemie-Handelsges.m.b.H., Germany |

TABLE 2

Components (II) and (III) used in the examples and in the comparison examples

| Component | Description | Trade name | Manufacturer |
|---|---|---|---|
| Glass fiber (II-1) | Round glass fiber, 4.5 mm long Diameter 10 μm | Vetrotex 995 EC10-4.5 | Saint-Gobain Vetrotex, France |
| Glass fiber (II-2) | Flat glass fiber, 3 mm long, main cross-sectional axis 28 μm, secondary cross-sectional axis 7 μm | Nittobo CSG3PA-82.0 | Nitto Boseki Co., Ltd., Japan |
| Kaolin (II-3) | CAS No. 1332-58-7 | Translink 445 | BASF SE, Germany |
| Mica (II-4) | CAS No. 12001-26-2 | Mica HLM 100 | Kärntner Montan-industrie, Austria |
| Antioxidant (III-1) | Ethylenebis(oxyethylene)bis[3-(5-tert-butyl-4-hydroxy-m-tolyl)propionate] CAS No.: 36443-68-2 | Irganox 245 | BASF SE, Germany |
| Black masterbatch (III-2) | 25 wt % black carbon in Radipol A45 (PA66) of RadiciChimica SpA, Italy | — | EMS-CHEMIE AG, Switzerland |
| Additive mixture (IIIM) | Weight ratio (III-1):(III-2) = 1:5 | — | — |

General Manufacturing Rule for Copolyamides

The manufacture of the copolyamides in accordance with the invention takes place in a manner known per se in known, stirrable pressure autoclaves having a presentation vessel and a reaction vessel.

Deionized water is presented in the presentation vessel and the monomers and possible additives are added. Inertization than takes place multiple times with nitrogen gas. Heating takes place to 180 to 230° C. while stirring at the pressure adopted to obtain a homogeneous solution. This solution is pumped through a screen into the reaction vessel and is there heated to the desired reaction temperature of 250 to 300° C. at a pressure of a maximum of 30 bar. The preparation is maintained at the reaction temperature for 2 to 4 hours in the pressure phase. In the subsequent expansion phase, the pressure is reduced to atmospheric pressure within 1 to 2 hours, with the temperature being able to fall a little. In the following degassing phase, the preparation is maintained at a temperature of 250 to 300° C. at atmospheric pressure for 0.5 to 6 hours. The polymer melt is discharged in strand form, cooled at 10 to 80° C. in the water bath, and pelletized. The pellets are dried at 60 to 120° C. under nitrogen or in vacuum to a water content of less than 0.1 wt %.

Suitable catalysts for accelerating the polycondensation reaction are acids containing phosphorous such as $H_3PO_2$, $H_3PO_3$, $H_3PO_4$, their salts or organic derivatives. The catalysts are preferably admixed in the range from 0.01 to 0.5 wt %, particularly preferably from 0.03 to 0.1 wt %, with respect to the polyamide.

Suitable anti-foaming agents for avoiding foam formation during the degassing are aqueous, 10% emulsions that contain silicones or silicone derivatives and that are used preferably in quantities from 0.01 to 1.0 wt %, particularly preferably from 0.01 to 0.10 wt %, with respect to the polyamide.

The setting of the relative viscosity and thus of the molar mass can take place in a manner known per se, e.g. via monofunctional amines or carboxylic acids, and/or difunctional diamines or dicarboxylic acids as chain regulators. Preferred monofunctional chain regulators for the copolyamides in accordance with the invention are benzoic acid, acetic acid, propionic acid, butylic acid, valericanic acid, capric acid, lauric acid, stearic acid, 2-ethylhexanoic acid, cyclohexanoic acid, propylamine, butylamine, pentylamine, hexylamine, 2-ethylhexylamine, n-octylamine, n-nonylamine, n-dodecylamine, n-tetradecylamine, n-hexadidcylamine, stearylamine, cyclohexylamine, 3-(cyclohexylamino) propylamine, methylcyclohexylamine, dimethylcyclohexylamine, benzylamine, 2-phenylethylamine, aniline, or triacetonediamine. The chain regulators can be used individually or in combination. Other monofunctional compounds can also be used as chain regulators which can react with an amino group or with an acid group, such as anhydrides, isocyanates, acid halides, amides, or esters. The typical quantity of use of the monofunctional chain regulators is 10 to 200 mmol per kg copolyamide.

Manufacture of the Copolyamide in Accordance with Example 2

The manufacture of the copolyamide PA 66/1,3-BAC6 in accordance with the invention of Example 2 will be explained in the following:

1.80 kg of deionized water was presented in a presentation vessel of a 20 l pressure autoclave and 3.68 kg 1,6-hexanedioic acid was stirred in. 1.63 kg 1,3-bis(aminomethyl) cyclohexane, 1.63 kg 1,6-hexanediamine, 1,2 g Antifoam RD 10 wt % emulsion as a defoaming agent and finally 15 g benzoic acid as a chain controller were added. The procedure was then carried out as follows:

Heating up to 210° C. took place after 10× inertization. The homogeneous solution was pumped through a screen into the reaction vessel at 210° C.

The preparation was heated to 290° C. while stirring and was held in the pressure phase at 20 bar for 2 hours. Pressure was relaxed to atmospheric pressure within 1.5 hours and subsequently degassed at 290° C. for one hour.

The polymer melt was discharged, cooled in the water bath (20° C.), and pelletized. The pellets were dried at 100° C. in vacuum (30 mbar) to a water content of less than 0.1 wt %.

The relative viscosity of the product amounted to 1.74; the glass transition temperature was 72° C. and the melting point 220° C.

General Manufacturing Rule for the Polyamide Moulding Compounds in Accordance with the Invention To manufacture the polyamide moulding compound in accordance with the invention, components (I), (II), and optionally (III) are mixed on conventional compounding machines such as single shaft or twin shaft extruders or screw kneaders. The components are here metered individually or are supplied in the form of a dry blend via gravimetric or volumetric metering trolleys into the feed or respectively into a side feeder.

If additives (component (III)) are used, they can be introduced directly or in the form of a masterbatch. The carrier material of the masterbatch is preferably a polyamide or a polyolefin. From the polyamides, the copolyamide (I) is particularly suitable for this.

The dried pellets of the copolyamide, and optionally additives (III), are mixed in a closed container for the dry blend preparation. This mixture is homogenized by means of a wobble mixer, a tumble mixer, or a tumble drier for 10 to 40 minutes. The homogenization can take place under a dried protective gas to avoid moisture absorption.

The compounding takes place at set cylinder temperatures of 250 to 310° C., with the temperature of the first cylinder being able to be set to below 90° C. Degassing can take place in front of the nozzle. This can take place by means of a vacuum or atmospherically. The melt is discharged in strand form, cooled at 10 to 80° C. in the water bath, and subsequently pelletized. Alternatively, the melt can also be pressed into a water bath through a perforated plate having a cutting device and the cut off pellets can be separated in a post-treatment path (underwater pelletizing). The pellets are dried at 60 to 120° C. under nitrogen or in vacuum to a water content of less than 0.1 wt %.

Manufacture of the Polyamide Moulding Compound in Accordance with Example 18

The dried pellets of the copolyamide from Example 2 and the additives (IIIM) were mixed to form a dry blend, and indeed in the ratio indicated in Table 6, Example 18. This mixture was homogenized by means of a tumble mixer for approximately 20 minutes.

The polyamide moulding compound was manufactured on a twin-shaft extruder of Werner & Pfleiderer type ZSK 25. The dry blend was here metered into the feed via a metering scale. The glass fiber (II-1) were conveyed into the melt by means of a metering scale and a side feeder 6 housing zones before the nozzle.

The temperature of the first housing was set to 50° C.; that of the remaining housings to 260 to 280° C. A speed of 250 r.p.m. and a throughput of 15 kg/h were used. No degassing took place. The melt strand was cooled in the water bath, cut, and the pellets obtained were dried at 100° C. in a vacuum (30 mbar) for 24 h to a water content of less than 0.1 wt %.

Experiment Results

The relative viscosity (RV), the glass transition temperature, the melting point, the crystallization temperature, and the crystallization rate of the copolyamides in accordance with the invention were determined. The corresponding values are shown for Examples 1 to 5 in accordance with the invention in Table 3, for Examples 6 to 12 in accordance with the invention in Table 4, and for Comparison examples 13 to 16 in Table 5.

All the copolymers manufactured or used in the examples and comparison examples contain Antifoam RD 10 wt % emulsion (silicone emulsion, manufacturer: Dow Corning S.A., Belgium, as a defoaming agent and benzoic acid as a chain regulator.

The moulding compounds in accordance with the invention of Examples 17 to 32 were examined with respect to the gloss value of the surface and the modulus of elasticity. The results of these examinations are shown in Tables 6 and 7.

The moulding compounds not in accordance with the invention of Comparison examples 33 to 37 were equally examined with respect to the surface gloss and the modulus of elasticity under the same measurement conditions. The results of the comparison examples are collected in Table 8.

TABLE 3

Examples 1 to 5 in accordance with the Invention for the copolyamide

| Component | Unit | Examples | | | | |
| --- | --- | --- | --- | --- | --- | --- |
| | | 1 | 2 | 3 | 4 | 5 |
| 1.6-hexanediamine (a1) | Mol % | 27.5 | 30.0 | 32.5 | 35.0 | 37.5 |
| 1,3-bis(aminomethyl)cyclohexane (a2) | Mol % | 22.5 | 20.0 | 17.5 | 15.0 | 12.5 |
| 1.6 - hexanedioic acid (a4) | Mol % | 50.0 | 50.0 | 50.0 | 50.0 | 50.0 |
| Measured values | | | | | | |
| Relative viscosity (RV)$^a$ | — | — | 1.75 | 1.74 | 1.79 | 1.81 | 1.85 |
| Glass transition temperature* | ° C. | 74 | 72 | 69 | 68 | 67 |
| Melting point** | ° C. | 214 | 220 | 227 | 230 | 235 |
| Crystallization temperature*** | ° C. | 161 | 175 | 180 | 188 | 197 |
| Crystallization rate*** | J/g min | 22 | 35 | 39 | 45 | 41 |

*RV relative viscosity measured at a solution of 0.5 g polyamide in 100 ml m-cresol at 20° C.
*Values of the 3rd heating
**Values of the 2nd heating
***Values on the cooling after the 1st heating

TABLE 4

Examples 6 to 12 in accordance with the invention for the copolyamide

| Component | Unit | Examples | | | | | | |
| --- | --- | --- | --- | --- | --- | --- | --- | --- |
| | | 6 | 7 | 8 | 9 | 10 | 11 | 12 |
| 1.6-hexanediamine (a1) | Mol % | 35.0 | 32.5 | 35.0 | 32.5 | 35.0 | 35.0 | 35.0 |
| 1,3-bis(aminomethyl)cyclohexane (a2) | Mol % | 10.0 | 15.0 | 10.0 | 15.0 | 10.0 | 15.0 | 15.0 |
| bis(4-amino-3-methyl-cyclohexyl)methane (a3-1) | Mol % | 5.0 | 2.5 | — | — | — | — | — |

TABLE 4-continued

Examples 6 to 12 in accordance with the invention for the copolyamide

| Component | Unit | Examples | | | | | | |
|---|---|---|---|---|---|---|---|---|
| | | 6 | 7 | 8 | 9 | 10 | 11 | 12 |
| bis(4-amino-cyclohexyl)methane (a3-2) | Mol % | — | — | 5.0 | 2.5 | — | — | — |
| Isophoronediamine (a3-3) | Mol % | — | — | — | — | 5.0 | — | — |
| Isophthalic acid (a5-1) | Mol % | — | — | — | — | — | 5.0 | — |
| Terephthalic acid (a5-2) | Mol % | — | — | — | — | — | — | 5.0 |
| 1.6-hexanedioic acid (a4) | Mol % | 50.0 | 50.0 | 50.0 | 50.0 | 50.0 | 45.0 | 45.0 |
| Measured values | | | | | | | | |
| Relative viscosity (RV)$^a$ | — | 1.79 | 1.79 | 1.84 | 1.83 | 1.61 | 1.80 | 1.83 |
| Glass transition temperature* | ° C. | 73 | 72 | 71 | 72 | 75 | 78 | 78 |
| Melting point** | ° C. | 228 | 224 | 231 | 224 | 221 | 223 | 225 |
| Crystallization temperature*** | ° C. | 182 | 179 | 186 | 181 | 171 | 158 | 163 |
| Crystallization rate*** | J/g min | 31 | 33 | 41 | 37 | 18 | 16 | 21 |

$^a$RV relative viscosity measured at a solution of 0.5 g polyamide in 100 ml m-cresol at 20° C.
*Values of the 3rd heating
**Values of the 2nd heating
***Values on the cooling after the 1st heating

TABLE 5

Examples 13 to 16 for the copolyamide

| Component | Unit | Comparison examples | | | |
|---|---|---|---|---|---|
| | | 13 | 14 | 15 | 16 |
| 1.6-hexanediamine (a1) | Mol % | 45.0 | 40.0 | 0.0 | 50.0 |
| 1,3-bis(aminomethyl)cyclohexane (a2) | Mol % | 5.0 | 10.0 | 50.0 | 0.0 |
| Isophthalic acid (a5-1) | Mol % | — | — | — | — |
| Terephthalic acid (a5-2) | Mol % | — | — | — | — |
| 1.6-hexanedioic acid (a4) | Mol % | 50.0 | 50.0 | 50.0 | 50.0 |
| Measured values | | | | | |
| Relative viscosity (RV)$^a$ | — | 1.84 | 1.90 | 1.60 | 1.79 |
| Glass transition temperature* | ° C. | 59 | 61 | 110 | 55 |
| Melting point** | ° C. | 250 | 240 | 229 | 261 |
| Crystallization temperature*** | ° C. | 216 | 205 | c | 229 |
| Crystallization rate*** | J/g min | 48 | 37 | c | 32 |

$^a$RV relative viscosity measured at a solution of 0.5 g polyamide in 100 ml m-cresol at 20° C.
*Values of the 3rd heating
**Values of the 2nd heating
***Values on the cooling after the 1st heating
c No crystallization on cooling after the 1st heating

TABLE 6

Examples 17 to 25 in accordance with the invention for the polyamide moulding compound

| Component | Unit | Examples | | | | | | | | |
|---|---|---|---|---|---|---|---|---|---|---|
| | | 17 | 18 | 19 | 20 | 21 | 22 | 23 | 24 | 25 |
| Copolyamide (I) PA 66/1,3- BAC6 from | — | Example 1 | Example 2 | Example 3 | Example 4 | Example 5 | Example 2 | Example 2 | Example 2 | Example 2 |
| Copolyamide (I) Amount | Wt % | 47.6 | 47.6 | 47.6 | 47.6 | 47.6 | 47.6 | 49.6 | 57.6 | 47.6 |
| Glass fibers (II-1), round | Wt % | 50.0 | 50.0 | 50.0 | 50.0 | 50.0 | — | 50.0 | — | 25.0 |
| Glass fibers (II-2), flat | Wt % | — | — | — | — | — | 50.0 | — | — | — |
| Kaolin (II-3) | Wt % | — | — | — | — | — | — | — | 40.0 | — |
| Mica (II-4) | Wt % | — | — | — | — | — | — | — | — | 25.0 |
| Additive mixture (IIIM) | Wt % | 2.4 | 2.4 | 2.4 | 2.4 | 2.4 | 2.4 | — | 2.4 | 2.4 |
| Antioxidant (III-1) | Wt % | — | — | — | — | — | — | 0.4 | — | — |

TABLE 6-continued

Examples 17 to 25 in accordance with the invention for the polyamide moulding compound

| Component | Unit | 17 | 18 | 19 | 20 | 21 | 22 | 23 | 24 | 25 |
|---|---|---|---|---|---|---|---|---|---|---|
| Measured values | | | | | | | | | | |
| Gloss value, 60°, dry | GU | 83 | 88 | 86 | 78 | 81 | 90 | 90 | 93 | 91 |
| Gloss value, 60°, conditioned | GU | 76 | 78 | 75 | 78 | 79 | 84 | 80 | 91 | 90 |
| Modulus of elasticity | MPa | 16300 | 16500 | 16600 | 16800 | 16900 | 16800 | 16600 | 6400 | 16700 |

TABLE 7

Examples 26 to 32 in accordance with the invention for the polyamide moulding compound

| Component | Unit | 26 | 27 | 28 | 29 | 30 | 31 | 32 |
|---|---|---|---|---|---|---|---|---|
| Copolyamide (I) PA 66/1,3- BAC6/MACM6 from | — | Example 6 | Example 7 | — | — | — | — | — |
| Copolyamide (I) PA 66/1,3- BAC6/PACM6 from | — | — | — | Example 8 | Example 9 | — | — | — |
| Copolyamide (I) PA 66/1,3- BAC6/IPD6 from | — | — | — | — | — | Example 10 | — | — |
| Polyamide (I) PA 66/6I//1,3-BAC6/1,3-BACI from | — | — | — | — | — | — | Example 11 | — |
| Polyamide (1) PA 66/6T/1,3-BAC6/1,3-BACT from | — | — | — | — | — | — | — | Example 12 |
| Copolyamide (I) Amount | Wt % | 47.6 | 47.6 | 47.6 | 47.6 | 47.6 | 47.6 | 47.6 |
| Glass fibers (II-1), round | Wt % | 50.0 | 50.0 | 50.0 | 50.0 | 50.0 | 50.0 | 50.0 |
| Additive mixture (IIIM) | Wt % | 2.4 | 2.4 | 2.4 | 2.4 | 2.4 | 2.4 | 2.4 |
| Measured values | | | | | | | | |
| Gloss value, 60°, dry | GU | 79 | 80 | 78 | 80 | 83 | 77 | 74 |
| Gloss value, 60°, conditioned | GU | 79 | 80 | 75 | 80 | 78 | 74 | 72 |
| Modulus of elasticity | MPa | 16400 | 16500 | 16600 | 16600 | 16500 | 16600 | 17000 |

TABLE 8

Examples 33 to 37 for the polyamide moulding compound

| Component | Unit | 33 | 34 | 35 | 36 | 37 |
|---|---|---|---|---|---|---|
| Copolyamide PA 66/1,3-BAC6 from | — | Comparison example 13 | Comparison example 14 | Comparison example 15 | Comparison example 16 | — |
| Copolyamide PA 66/1,3-BAC6 from | — | — | — | — | — | Example 2 |
| Copolyamide Amount | Wt % | 47.6 | 47.6 | 47.6 | 47.6 | 97.6 |
| Glass fibers (II-1), round | Wt % | 50.0 | 50.0 | 50.0 | 50.0 | — |
| Additive mixture (IIIM) | Wt % | 2.4 | 2.4 | 2.4 | 2.4 | 2.4 |
| Measured values | | | | | | |
| Gloss value, 60°, dry | GU | 57 | 57 | 65 | 48 | 93 |
| Gloss value, 60°, conditioned | GU | 49 | 57 | 2 | 43 | 89 |
| Modulus of elasticity | MPa | 16700 | 17000 | 15600 | 16800 | 2600 |

Discussion of the Results

In the comparison of the copolyamides in accordance with the invention of Examples 1 to 12 with the copolyamides not in accordance with the invention of Comparison examples 13 to 16, the copolyamides in accordance with the invention show the lower melting temperature and crystallization temperature.

The plates of the polyamide moulding compounds in accordance with the invention of Examples 17 to 23 and 26 to 32 from copolyamides in accordance with the invention filled with glass fibers of Examples 1 to 12 consistently show a better gloss value than the plates of the comparison materials of Comparison examples 33, 34, and 36, and indeed both dry and conditioned.

Plates from the polyamide moulding compounds of Examples 24 and 25, that are only filled with mineral or with a mixture of glass fibers and mineral, show the best gloss results.

With the PA 1,3-BAC6 of Comparison example 35 filled with glass fibers, the plates for the examination of the gloss value were only able to be injected at a tool temperature of 80° C. since higher tool temperatures cause pronounced ejection marks and cycle times that are too long. In the dry state, the gloss value admittedly reaches a high value, but this drops by a large amount due to the conditioning since post-crystallization occurs in this process.

The plates from PA 66 of Comparison example 36 filled with glass fibers show its lack of suitability for visible parts since the surface quality is not sufficient.

To be able to achieve a modulus of elasticity of at least 5000 MPa, the polyamide moulding compound in accordance with the invention must contain filler such as can be seen from the polyamide moulding compound of Comparison example 37.

The invention claimed is:

1. A semi-crystalline copolyamide formed from the following monomers (a1) to (a5):
   (a1) 23 to 37.5 mol % 1,6-hexanediamine;
   (a2) 12.5 to 22 mol % 1,3-bis(aminomethyl)cyclohexane;
   (a3) 0 to 5 mol % at least one diamine selected from the group consisting of ethylenediamine, butanediamine, pentanediamine, methylpentanediamine, 1,8-octanediamine, methyloctanediamine, 1,9-nonanediamine, 1,10-decanediamine, 1,11-undecanediamine, 1,12-dodecaneamine, trimethyl hexamethylenediamine, m-xylylenediamine, and p-xylylenediamine;
   (a4) 45 to 50 mol % 1,6-hexanedioic acid; and
   (a5) 0 to 5 mol % at least one dicarboxylic acid with 2 to 44 carbon atoms, differing from monomer (a4);
   wherein the proportions of the monomers (a1), (a2), and (a3) are with respect to the sum of the diamines utilized and add up to 50 mol %;
   wherein the proportions of the monomers (a4) and (a5) are with respect to the sum of the dicarboxylic acids utilized and add up to 50 mol %;
   wherein the monomers (a1) to (a5) add up to 100 mol %;
   wherein the copolyamide has a melting temperature in the range from 180 to 235° C.; and
   when the semi-crystalline copolyamide is combined with a filler to form a moulding compound, the resulting moulding compound would have a modulus of elasticity in accordance with ISO 527 of at least 5000 MPa.

2. The copolyamide in accordance with claim 1, wherein:
   the proportion of monomer (a1) in the copolyamide is in the range from 23 to 35 mol-%; and/or
   the proportion of monomer (a2) in the copolyamide is in the range from 14 to 22 mol %; and/or
   the proportion of monomer (a3) in the copolyamide is in the range from 0 to 2.5 mol-%;
   wherein the proportions of the monomers (a1), (a2), and (a3) are with respect to the sum of the diamines used and add up to 50 mol %.

3. The copolyamide in accordance with claim 2, wherein:
   the proportion of monomer (a1) in the copolyamide is in the range from 25 to 32.5 mol %, and/or
   the proportion of monomer (a2) in the copolyamide is in the range from 16 to 20 mol %.

4. The copolyamide in accordance with claim 1, wherein:
   the proportion of monomer (a4) in the copolyamide is in the range from 47.5 to 50 mol %; and/or
   the proportion of monomer (a5) in the copolyamide is in the range from 0 to 2.5 mol-%,
   wherein the proportions of monomers (a4) and (a5) are with respect to the sum of the dicarboxylic acids utilized and add up to 50 mol %.

5. The copolyamide in accordance with claim 1, wherein:
   the at least one monomer (a5) is selected from the group consisting of isophthalic acid, terephthalic acid, naphthalene dicarboxylic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,15-pentadecanoic acid, 1,16-hexadecanedioic acid, 1,17-heptadecanedioic acid, 1,18-octadecanedioic acid, arachidic acid, Japan acid, behenic acid, cyclohexanedioic acid, phenylindanedicarboxylic acid, phenylenedioxydiacetic acid, and dimer fatty acid with 35 or 44 carbon atoms.

6. The copolyamide in accordance with claim 1, wherein the copolyamide has a relative viscosity, measured with 0.5 g in 100 ml m-cresol at 20° C., of 1.45 to 2.10.

7. The copolyamide in accordance with claim 6, wherein the copolyamide has a relative viscosity, measured with 0.5 g in 100 ml m-cresol at 20° C., of 1.50 to 2.05.

8. The copolyamide in accordance with claim 1, wherein the copolyamide has at least one of the following properties:
   a glass transition temperature in the range from 50 to 200° C.,
   a crystallization temperature in the range from 130 to 200° C., and
   a crystallization rate in the range from 12 to 50 J/g min.

9. A polyamide moulding compound comprising a copolyamide formed from the following monomers (a1) to (a5):
   (a1) 23 to 37.5 mol % 1,6-hexanediamine;
   (a2) 12.5 to 22 mol % 1,3-bis(aminomethyl)cyclohexane;
   (a3) 0 to 2.5 mol % at least one diamine with 2 to 35 carbon atoms, differing from monomers (a1) and (a2);
   (a4) 45 to 50 mol % 1,6-hexanedioic acid; and
   (a5) 0 to 5 mol % at least one dicarboxylic acid with 2 to 44 carbon atoms, differing from monomer (a4);
   wherein the proportions of the monomers (a1), (a2), and (a3) are with respect to the sum of the diamines utilized and add up to 50 mol %;
   wherein the proportions of the monomers (a4) and (a5) are with respect to the sum of the dicarboxylic acids utilized and add up to 50 mol %;
   wherein the monomers (a1) to (a5) add up to 100 mol %; and
   wherein the copolyamide has a melting temperature in the range from 180 to 235° C.;
   and a filler.

10. A polyamide moulding material consisting of
    (i) 22 to 70 wt % of at least one copolyamide in accordance with claim 1;
    (ii) 30 to 70% by weight of at least one filler; and
    (iii) 0 to 8 wt % of at least one additive,
    wherein component (iii) differs from component (ii), and wherein the proportion of components (i) to (iii) add up to 100 wt %.

11. The polyamide moulding material in accordance with claim 10, wherein a moulding manufactured from the polyamide moulding material has at least one of the following properties:
    a modulus of elasticity determined in accordance with ISO 527 of at least 5000 MPa, and/or
    a gloss value of 70 to 100 GU determined in accordance with DIN EN 2813 (2015) in the dry state at 60°; and/or
    a gloss value of 60 to 100 GU determined in accordance with DIN EN 2813 (2015) in the conditioned state at 60°.

12. A moulding produced from the copolyamide of claim 1.

13. A moulding produced from a polyamide moulding material in accordance with claim 10.

14. The moulding in accordance with claim 13, wherein the moulding is selected from the group consisting of non-lacquered visible parts with or without a function, car passenger compartment or trunk parts, household parts, mechanical engineering parts, parts of electrical devices, parts of electronic devices, parts of domestic appliances, and parts of furniture.

15. A semi-crystalline copolyamide formed from the following monomers (a1), (a2), (a4), and (a5):
   (a1) 23 to 37.5 mol % 1,6-hexanediamine;
   (a2) 12.5 to 22 mol % 1,3-bis(aminomethyl)cyclohexane;
   (a4) 45 to 50 mol % 1,6-hexanedioic acid; and
   (a5) 0 to 5 mol % at least one dicarboxylic acid with 2 to 44 carbon atoms, differing from monomer (a4);
   wherein the proportions of the monomers (a1) and (a2) are with respect to the sum of the diamines utilized and add up to 50 mol %;
   wherein the proportion of monomer (a4), and of monomer (a5) if present, are with respect to the sum of the dicarboxylic acids utilized and add up to 50 mol %; and
   wherein the monomers (a1), (a2), and (a4), and (a5) if present, add up to 100 mol %; and
   wherein the copolyamide has a melting temperature in the range from 180 to 235° C.; and
   when the semi-crystalline copolyamide is combined with a filler to form a moulding compound, the resulting moulding compound would have a modulus of elasticity in accordance with ISO 527 of at least 5000 MPa.

\* \* \* \* \*